US012503740B2

(12) United States Patent
Perlade et al.

(10) Patent No.: US 12,503,740 B2
(45) Date of Patent: Dec. 23, 2025

(54) COLD ROLLED AND DOUBLE ANNEALED STEEL SHEET

(71) Applicant: ArcelorMittal, Luxembourg (LU)

(72) Inventors: Astrid Perlade, Le Ban-Saint-Martin (FR); Kangying Zhu, Metz (FR); Frédéric Kegel, Yutz (FR)

(73) Assignee: ArcelorMittal, Luxembourg (LU)

( * ) Notice: Subject to any disclaimer, the term of this patent is extended or adjusted under 35 U.S.C. 154(b) by 342 days.

(21) Appl. No.: 18/016,572

(22) PCT Filed: Jul. 12, 2021

(86) PCT No.: PCT/IB2021/056241
§ 371 (c)(1),
(2) Date: Jan. 17, 2023

(87) PCT Pub. No.: WO2022/018566
PCT Pub. Date: Jan. 27, 2022

(65) Prior Publication Data
US 2023/0295757 A1    Sep. 21, 2023

(30) Foreign Application Priority Data
Jul. 24, 2020  (WO) .................. PCT/IB2020/056999

(51) Int. Cl.
C21D 8/02    (2006.01)
C21D 9/46    (2006.01)
C22C 38/00   (2006.01)
C22C 38/04   (2006.01)
C22C 38/06   (2006.01)
C22C 38/12   (2006.01)

(52) U.S. Cl.
CPC ......... *C21D 8/0236* (2013.01); *C21D 8/0273* (2013.01); *C21D 9/46* (2013.01); *C22C 38/001* (2013.01); *C22C 38/002* (2013.01); *C22C 38/04* (2013.01); *C22C 38/06* (2013.01); *C22C 38/12* (2013.01); *C21D 2211/001* (2013.01); *C21D 2211/005* (2013.01); *C21D 2211/008* (2013.01)

(58) Field of Classification Search
CPC ...... C21D 8/0236; C21D 8/0273; C21D 9/46; C21D 2211/001; C21D 2211/005; C21D 2211/008; C21D 1/26; C21D 6/005; C22C 38/001; C22C 38/002; C22C 38/04; C22C 38/06; C22C 38/12; C22C 38/02; C22C 38/14; C22C 38/38; C22C 38/22; C22C 38/24; C22C 38/26; C22C 38/28; C22C 38/32; B23K 11/11
See application file for complete search history.

(56) References Cited

U.S. PATENT DOCUMENTS

| 10,633,727 | B2 | 4/2020 | Garza-Martinez et al. |
| 2016/0312323 | A1 | 10/2016 | Rana et al. |
| 2019/0040489 | A1 | 2/2019 | Hasegawa et al. |
| 2019/0292622 | A1 | 9/2019 | Garat et al. |
| 2019/0368002 | A1 | 12/2019 | Hayashi et al. |
| 2020/0248281 | A1 | 8/2020 | Lee et al. |
| 2020/0370141 | A1 | 11/2020 | Zhu et al. |
| 2021/0115528 | A1 | 4/2021 | Magar et al. |
| 2021/0317554 | A1 | 10/2021 | Ryu et al. |
| 2022/0002847 | A1 | 1/2022 | Krizan et al. |

FOREIGN PATENT DOCUMENTS

| CN | 102925790 A | 2/2013 |
| CN | 107858586 A | 3/2018 |
| CN | 109072371 A | 12/2018 |
| CN | 109715843 A | 5/2019 |
| CN | 110066964 A | 7/2019 |
| CN | 111218621 A | 6/2020 |
| CN | 111433376 A | 7/2020 |
| EP | 3492618 A1 | 6/2019 |
| JP | 2017218672 A | 12/2017 |

(Continued)

OTHER PUBLICATIONS

Search Report of PCT/IB2021/056233 dated Oct. 8, 2021 and International Report on Patentability.
Search Report of PCT/IB2021/056243 dated Oct. 8, 2021 and International Report on Patentability.
Search Report of PCT/IB2021/056235 dated Sep. 8, 2021 and International Report on Patentability.
Search Report of PCT/IB2021/056241 dated Oct. 4, 2021 and International Report on Patentability.
Search Report of PCT/IB2021/056237 dated Aug. 4, 2021 and International Report on Patentability.
Search Report of PCT/IB2021/056245 dated Aug. 4, 2021 and International Report on Patentability.

(Continued)

*Primary Examiner* — Adil A. Siddiqui
(74) *Attorney, Agent, or Firm* — Davidson Kappel LLC

(57) ABSTRACT

A cold rolled and double annealed steel sheet, made of a steel having a composition including, by weight percent: C: 0.03-0.18%, Mn: 6.0-11.0%, 0.2≤Al<3%, Mo: 0.05-0.5%, B: 0.0005-0.005%, S≤0.010%, P≤0.020%, N≤0.008%, and including optionally one or more of the following elements. In weight percentage: Si≤1.20%, Nb≤0.050%, Ti≤0.050%, Cr≤0.5%,V≤0.2%, the remainder of the composition being iron and unavoidable impurities resulting from the smelting, the steel sheet having a microstructure including, in surface fraction, from 0% to 45% of ferrite, from 20% to 50% of retained austenite, from 5 to 80% of annealed martensite, less than 5% of fresh martensite, a carbon $[C]_A$ and manganese $[Mn]_A$ content in austenite, expressed in wt %, such that the ratio $([C]_A^2 \times [Mn]_{A/(C\%)}^2 \times Mn\%)$ is from 4.5 to 11.0, C % and Mn % being the nominal C and Mn weight percent in the steel and a carbides density below $4 \times 10^6$/mm².

11 Claims, No Drawings

(56) References Cited

FOREIGN PATENT DOCUMENTS

| | | |
|---|---|---|
| JP | 2018003050 A | 1/2018 |
| JP | 2018536764 A | 12/2018 |
| JP | 2019014933 A | 1/2019 |
| JP | 2019039037 A | 3/2019 |
| KR | 20040059293 A | 7/2004 |
| KR | 20170075853 A | 7/2017 |
| KR | 20190109407 | 9/2019 |
| KR | 20200024398 A | 3/2020 |
| WO | WO2016001889 A2 | 1/2016 |
| WO | WO2017109541 A1 | 6/2017 |
| WO | WO 2017/212885 A1 | 12/2017 |
| WO | WO2018054787 A1 | 3/2018 |
| WO | WO2018131722 A1 | 7/2018 |
| WO | WO2019122961 A1 | 6/2019 |
| WO | WO 2019123245 A1 | 6/2019 |
| WO | WO 2019134102 A1 | 7/2019 |
| WO | WO 2019155014 A1 | 8/2019 |
| WO | WO2020011638 | 1/2020 |
| WO | WO2020050573 A1 | 3/2020 |
| WO | WO 2022/018562 A1 | 1/2022 |
| WO | WO 2022/018563 A1 | 1/2022 |
| WO | WO 2022/018565 A1 | 1/2022 |
| WO | WO 2022/018566 A1 | 1/2022 |
| WO | WO 2022/018567 A1 | 1/2022 |
| WO | WO 2022/018568 A1 | 1/2022 |
| WO | WO 2022/018569 A1 | 1/2022 |
| WO | WO 2022/018571 A1 | 1/2022 |

OTHER PUBLICATIONS

Search Report of PCT/IB2021/056244 dated Aug. 24, 2021 and International Report on Patentability.

Search Report of PCT/IB2021/056247 dated Oct. 4, 2021 and International Report on Patentability.

Lee et al.: "Observation of the TWIP + TRIP Plasticity-Enhancement Mechanism in Al-Added 6 Wt Pct Medium Mn Steel," Metallurgical and Materials Transactions A, vol. 46A, Jun. 2015, 2356-2363.

COLD ROLLED AND DOUBLE ANNEALED STEEL SHEET

The present invention relates to a high strength steel sheet having good weldability properties and to a method to obtain such steel sheet.

BACKGROUND

To manufacture various items such as parts of body structural members and body panels for automotive vehicles, it is known to use sheets made of DP (Dual Phase) steels or TRIP (Transformation Induced Plasticity) steels.

SUMMARY OF THE INVENTION

One of the major challenges in the automotive industry is to decrease the weight of vehicles in order to improve their fuel efficiency in view of the global environmental conservation, without neglecting the safety requirements. To meet these requirements, new high strength steels are continuously developed by the steelmaking industry, to have sheets with improved yield and tensile strengths, and good ductility and formability.

One of the developments made to improve mechanical properties is to increase content of manganese in steels. The presence of manganese helps to increase ductility of steels thanks to the stabilization of austenite. But these steels present weaknesses of brittleness. To overcome this problem, elements as boron are added. These boron-added chemistries are very tough at the hot-rolled stage but the hot band is too hard to be further processed. The most efficient way to soften the hot band is batch annealing, but it leads to a loss of toughness.

In addition to these mechanical requirements, such steel sheets have to show a good resistance to liquid metal embrittlement (LME). Zinc or Zinc-alloy coated steel sheets are very effective for corrosion resistance and are thus widely used in the automotive industry. However, it has been experienced that arc or resistance welding of certain steels can cause the apparition of particular cracks due to a phenomenon called Liquid Metal Embrittlement ("LME") or Liquid Metal Assisted Cracking ("LMAC"). This phenomenon is characterized by the penetration of liquid Zn along the grain boundaries of underlying steel substrate, under applied stresses or internal stresses resulting from restraint, thermal dilatation or phases transformations. It is known that adding elements like carbon or silicon are detrimental for LME resistance.

The automotive industry usually assesses such resistance by limiting the upper value of a so-called LME index calculated according to the following equation:

$$\text{LME index} = C\% + Si\%/4,$$

wherein C % and Si % stands respectively for the weight percentages of carbon and silicon in the steel.

The publication WO2020011638 relates to a method for providing a medium and intermediate manganese (Mn between 3.5 to 12%) cold-rolled steel with a reduced carbon content. Two process routes are described. The first one concerns an intercritical annealing of the cold rolled steel sheet. The second one concerns a double annealing of the cold rolled steel sheet, the first one being fully austenitic, the second one being intercritical. Thanks to the choice of the annealing temperature, a good compromise of tensile strength and elongation is obtained. By lowering annealing temperature an enrichment in austenite is obtained, which implies a good fracture thickness strain value. But the low amount of carbon and manganese used in the invention limits the tensile strength of the steel sheet to values not higher than 980 MPa.

An object of the present invention is to provide a steel sheet having a combination of high mechanical properties with a tensile strength TS above or equal to 900, a uniform elongation UE above or equal to 11.0%, a yield strength above or equal to 700 MPa and satisfying the equation $[(YS-200) \times UE + (TS-300) \times TE]/(C\% \times Mn\%)$ above 29 000, TE being the total elongation of the sheet expressed in %, the tensile strength TS being expressed in MPa, the yield strength YS being expressed in MPa, the uniform elongation UE being expressed in %, C % and Mn % being the nominal wt % of C and Mn the steel.

Preferably the steel sheet has a total elongation TE above or equal to 15.0%,

Preferably, the steel sheet according to the invention has a LME index of less than 0.36.

Preferably, the steel sheet according to the invention has a carbon equivalent Ceq lower than 0.4%, the carbon equivalent being defined as $$Ceq = C\% + Si\%/55 + Cr\%/20 + Mn\%/19 - Al\%/18 + 2.2P\% - 3.24B\% - 0.133 * Mn\% * Mo\%$$

with elements being expressed by weight percent.

Preferably, the resistance spot weld of two steel parts of the steel sheet according to the invention has an a value of at least 30 daN/mm2.

The present invention provides a cold rolled and double annealed steel sheet, made of a steel having a composition comprising, by weight percent:

C: 0.03-0.18%

Mn: 6.0-11.0%

0.2≤Al<3%

Mo: 0.05-0.5%

B: 0.0005-0.005%

S≤0.010%

P≤0.020%

N≤0.008% and comprising optionally one or more of the following elements, in weight percentage:

Si≤1.20%

Nb≤0.050%

Ti≤0.050%

Cr≤0.5%

V≤0.2% the remainder of the composition being iron and unavoidable impurities resulting from the smelting.

said steel sheet having a microstructure comprising, in surface fraction:

from 0% to 45% of ferrite, from 20% to 50% of retained austenite, from 5 to 80% of annealed martensite, less than 5% of fresh martensite, a carbon $[C]_A$ and manganese $[Mn]_A$ content in austenite, expressed in wt %, such that the ratio $([C]_A^2 \times [Mn]$ $_A$)/(C %$^2$×Mn %) is from 4.5 to 11.0, C % and Mn % being the nominal C and Mn weight percent in the steel and a carbides density below 4×10$^6$/mm$^2$.

DETAILED DESCRIPTION

The invention will now be described in detail and illustrated by examples without introducing limitations.

According to the invention the carbon content is from 0.03% to 0.18% to ensure a satisfactory strength and good weldability properties. Above 0.18% of carbon, weldability of the steel sheet and the resistance to LME may be reduced. The temperature of the soaking depends on carbon content: the higher the carbon content, the lower the soaking temperature to stabilize austenite. If the carbon content is lower than 0.03%, the strength of the annealed martensite is not enough to get UTS above 900 MPa. In a preferred embodiment of the invention, the carbon content is from 0.05% to 0.15%. In another preferred embodiment of the invention, the carbon content is from 0.08 to 0.12% or even better from 0.08 to 0.10%

The manganese content is comprised from 6.0% to 11.0%. Above 11.0% of addition, weldability of the steel sheet may be reduced, and the productivity of parts assembly can be reduced. Moreover, the risk of central segregation increases to the detriment of the mechanical properties. As the temperature of soaking depends on manganese content too, the minimum of manganese is defined to stabilize austenite, to obtain, after soaking, the targeted microstructure and strengths. Preferably, the manganese content is from 6.0% to 9%.

According to the invention, aluminium content is from 0.2% to 3% to decrease the manganese segregation during casting. Aluminium is a very effective element for deoxidizing the steel in the liquid phase during elaboration. Above 3% of addition, the weldability of the steel sheet may be reduced, so as castability. Moreover, tensile strength above 900 MPa is difficult to achieve. Moreover, the higher the aluminium content, the higher the soaking temperature to stabilize austenite. Aluminium is added at least up to 0.2% to improve product robustness by enlarging the intercritical range, and to improve weldability. Moreover, aluminium can be added to avoid the occurrence of inclusions and oxidation problems. In a preferred embodiment of the invention, the aluminium content is from 0.2% to 2.2% and more preferably from 0.7 to 2.2%.

The molybdenum content is from 0.05% to 0.5% to decrease the manganese segregation during casting. Moreover, an addition of at least 0.05% of molybdenum provides resistance to brittleness. Above 0.5%, the addition of molybdenum is costly and ineffective in view of the properties which are required. In a preferred embodiment of the invention, the molybdenum content is from 0.15% to 0.35%.

According to the invention, the boron content is from 0.0005% to 0.005% to improve the toughness of the hot rolled steel sheet and the spot weldability of the cold rolled steel sheet. Above 0.005%, the formation of boro-carbides at the prior austenite grain boundaries is promoted, making the steel more brittle. In a preferred embodiment of the invention, the boron content is from 0.001% to 0.003%.

Optionally some elements can be added to the composition of the steel according to the invention.

The maximum addition of silicon content is limited to 1.20% to improve LME resistance. In addition, this low silicon content makes it possible to somplify the process by eliminating the step of pickling the hot rolled steel sheet before the hot band annealing. Preferably the maximum silicon content added is 0.8%.

Titanium can be added up to 0.050% to provide precipitation strengthening. Preferably, a minimum of 0.010% of titanium is added in addition of boron to protect boron against the formation of BN.

Niobium can optionally be added up to 0.050% to refine the austenite grains during hot-rolling and to provide precipitation strengthening. Preferably, the minimum amount of niobium added is 0.010%.

Chromium and vanadium can optionally be respectively added up to 0.5% and 0.2% to provide improved strength.

The remainder of the composition of the steel is iron and impurities resulting from the smelting. In this respect, P, S and N at least are considered as residual elements which are unavoidable impurities. Their content is less than or equal to 0.010% for S, less than or equal to 0.020% for P and less than or equal to 0.008% for N.

The microstructure of the steel sheet according to the invention will now be described. It contains, in surface fraction:

from 0% to 45% of ferrite.
from 20% to 50% of retained austenite.
from 5 to 80% of annealed martensite.
less than 5% of fresh martensite.
a carbon [C]$_A$ and manganese [Mn]$_A$ content in austenite, expressed in wt %, such that the ratio ([C]$_A^2$×[Mn]$_A$)/(C %$^2$×Mn %) is from 4.5 to 11.0, C % and Mn % being the nominal C and Mn weight percent in the steel and
a carbides density below 4×10$^6$/mm$^2$.

The microstructure of the steel sheet according to the invention contains from 20% to 50% of retained austenite. Below 20% of austenite, the uniform elongation UE can not reach the minimum values of 11.0%. Above 50%, the yield strength is below 700 MPa.

Such austenite can be formed during the intercritical annealing of the hot-rolled steel sheet but also during the first annealing of the cold rolled steel sheet or during the second annealing by the transformation of part of the martensite at high temperature.

The carbon [CA]$_A$ and manganese [Mn]$_A$ contents in austenite, expressed in weight percent, are such that the ratio ([C]$_A^2$×[Mn]$_A$)/(C %$^2$×Mn %) is from 4.5 to 11.0, C % and Mn % being the nominal C and Mn weight percent in the steel. This formula shows the partitioning level of carbon and manganese into the retained austenite. When the ratio is below 4.5, the yield strength cannot reach the minimum level of 700 MPa. When the ratio is above 11.0, the retained austenite is too stable to provide a sufficient TRIP-TWIP effect during deformation. Such TWIP-TRIP effect is notably explained in "Observation-of-the-TWIP-TRIP-Plasticity-Enhancement-Mechanism-in-Al-Added-6-Wt-Pct-Medium-Mn-Steel", DOI: 10.1007/s11661-015-2854-z, The Minerals, Metals & Materials Society and ASM International 2015, p. 2356 Volume 46A, June 2015 (S. LEE, K. LEE, and B. C. DE COOMAN).

The microstructure of the steel sheet according to the invention contains from 0 to 45% of ferrite. Such ferrite can be formed during the first annealing of the cold rolled steel sheet, when it takes place at a temperature below Ac3 of the cold rolled steel sheet. When the first annealing of the cold rolled steel sheet takes place above Ac3 of the cold rolled steel sheet, no ferrite is present. In a preferred embodiment, such ferrite is recrystallized and shows equiaxed grains with a shape ratio below 2.

The microstructure of the steel sheet according to the invention contains from 5 to 80% of annealed martensite. Such martensite can be formed upon cooling after the intercritical annealing of the hot-rolled steel sheet, by transformation of a part of austenite, that is less rich in carbon and manganese than the nominal values. But it is mostly formed upon cooling after the first annealing of the cold rolled steel sheet and then gets annealed during the second annealing of the cold rolled steel sheet. Such annealed martensite can be tempered martensite and/or recovered and/or recrystallized martensite. When the second annealing is performed in the lower range of temperatures, the martensite may preferably be tempered martensite and recovered martensite. When the second annealing is performed in the higher range of temperatures, the martensite may preferably be recovered and recrystallized martensite.

Fresh martensite can be present below 5% in surface fraction but is not a phase that is desired in the microstructure of the steel sheet according to the invention. It can be formed during the final cooling step to room temperature by transformation of unstable austenite poor in manganese and carbon. Indeed, this unstable austenite with low carbon and manganese contents leads to a martensite start temperature Ms above 20° C. To obtain the final mechanical properties, the fresh martensite has to be below 5% and preferably below 3% or even better reduced down to 0%.

Finally, the carbides density should remain below $4 \times 10^6$/mm$^2$ to ensure that the equation [(YS−200)×UE+(TS−300)×TE]/(C %×Mn %) remains above 29 000.

In a first embodiment, the microstructure comprises from 5% to 25% of ferrite, from 25% to 50% of retained austenite and from 25% to 70% of annealed martensite.

In another embodiment, the microstructure comprises no ferrite, from 25% to 45% of retained austenite and from 55% to 75% of annealed martensite.

The steel sheet according to the invention has a tensile strength TS above or equal to 900 MPa, a uniform elongation UE above or equal to 11.0%, a yield strength above or equal to 700 MPa and satisfying the equation [(YS−200)×UE+(TS−300)×TE]/(C %×Mn %) above 29 000, TE being the total elongation of the sheet.

Preferably the steel sheet has a total elongation TE above or equal to 15.0%,

Preferably, the steel sheet according to the invention has a LME index of less than 0.36.

Preferably, the steel sheet according to the invention has a carbon equivalent Ceq lower than 0.4%, the carbon equivalent being defined as Ceq=C %+Si %/55+Cr %/20+Mn %/19-Al %/18+
2.2P %-3.24B %-0.133*Mn %/*Mo % with elements being expressed by weight percent.

A welded assembly can be manufactured by producing two parts out of sheets of steel according to the invention, and then perform resistance spot welding of the two steel parts.

The resistance spot welds joining the first sheet to the second sheet are characterized by a high resistance in cross-tensile test defined by an a value of at least 30 daN/mm$^2$.

The steel sheet according to the invention can be produced by any appropriate manufacturing method and the [[man]]person skilled in the art can define one. It is however preferred to use the method according to the invention comprising the following steps:

A semi-product able to be further hot-rolled, is provided with the steel composition described above. The semi product is heated to a temperature from 1150° C. to 1300° C., so to make it possible to ease hot rolling, with a final hot rolling temperature FRT from 800° C. to 1000° C. Preferably, the FRT is from 850° C. to 950° C.

The hot-rolled steel is then cooled and coiled at a temperature $T_{coil}$ from 20° C. to 650° C., and preferably from 300 to 500° C.

The hot rolled steel sheet is then cooled to room temperature and can be pickled.

The hot rolled steel sheet is then annealed to an annealing temperature $T_{HBA}$ from Tc to 680° C. Tc corresponds to the temperature at which carbides are fully dissolved and can be determined by FEG-SEM observations after heat treatment. In this range, the annealing will allow minimizing the area fraction of precipitated carbides and promote manganese partitioning into austenite. Moreover, below 680° C., the microstructure is not coarsened. Tc is higher than Ac1 as Tc is the boundary line between the ferrite/austenite/carbides three-phase region and the ferrite/austenite biphase region, which is higher than Ac1 temperature, since Ac1 is the boundary line between the ferrite/carbide region and the ferrite/austenite/carbides region. Preferably the temperature $T_{HBA}$ is from 600° C. to 680° C.

The steel sheet is maintained at said temperature $T_{HBA}$ for a holding time $t_{HBA}$ from 0.1 to 120 h to promote manganese diffusion. Moreover, this heat treatment of the hot rolled steel sheet allows decreasing the hardness while maintaining the toughness of the hot-rolled steel sheet.

The hot rolled and heat-treated steel sheet is then cooled to room temperature and can be pickled to remove oxidation.

The hot rolled and heat-treated steel sheet is then cold rolled at a reduction rate from 20% to 80%.

The cold rolled steel sheet is then submitted to a first annealing at a temperature $T_1$ from (Ac1+Ac3)/2 to (Ac3+80) for a holding time $t_1$ of 10 s to 1800 s. When $T_1$ is higher than this limit, not enough austenite can be stabilized at room temperature. Preferably, $T_1$ is from 720 to 900° C. and more preferably from 720° C. to 870° C. and the time $t_1$ is from 100 to 1000 s. Such annealing can be performed by continuous annealing.

The cold rolled and annealed steel sheet is then cooled down below 80° C., preferably at an average cooling rate of at least 0.1° C/s and preferably of at least 1° C/s. The microstructure of the sheet is then composed of austenite and martensite and can also comprise ferrite if the annealing temperature was below Ac3. Such ferrite will not be present if the annealing is performed above Ac3.

After cooling, the steel sheet is then submitted to a second annealing step at a temperature $T_2$ from 350 to 650° C. during a time $t_2$ from 1 to 100 h. Preferably, $T_2$ is from 400 to 650° C. and $t_2$ is from to 1 to 50 h. This step can be performed by batch annealing.

The main objective of the second annealing is to temper the martensite at the beginning of the annealing, when the temperature is still low. Then, when the temperature increases, the partitioning of carbon and manganese into austenite from neighboring martensite is continued. Finally, when the temperature reaches $T_2$, part of the martensite is transformed into austenite.

The second annealing temperature $T_2$ is dependent on the chemical composition, the intermediate batch annealing and the first annealing. It should be low enough to limit unstable austenite formation which would then transformed into fresh martensite with a small deformation, leading to a decrease of both yield strength and elongation. It should be low enough to avoid the formation of unstable austenite that would get transformed into fresh martensite upon final cooling, leading to a decrease in elongation. It should also be high enough to avoid the formation of too much carbides, which consume carbon and manganese and lead to a decrease in strength. This carbide formation can especially happen when the second annealing temperature $T_2$ is below Tc value of the steel sheet.

The second annealing temperature $T_2$ should be also high enough to avoid the formation of too stable austenite, which leads to a decrease of elongation due to the lack of TRIP-TWIP effect.

The cold rolled and double annealed steel sheet is then cooled to room temperature and a small proportion of fresh martensite may be formed during such cooling by transformation of a part of austenite poorer in manganese and carbon.

The sheet can then be coated by any suitable process including hot-dip coating, electrodeposition or vacuum coating of zinc or zinc-based alloys or of aluminium or aluminium-based alloys.

The invention will be now illustrated by the following examples, which are by no way limitative.

Examples

Three grades, whose compositions are gathered in table 1, were cast in semi-products and processed into steel sheets.

TABLE 1

Compositions

| Steel | C | Mn | Al | Mo | B | S | P | N | Si | Nb | Ti | Ac1 (° C.) | Ac3 (° C.) | Ceq |
|---|---|---|---|---|---|---|---|---|---|---|---|---|---|---|
| A | 0.07 | 7.92 | 0.90 | 0.322 | 0.002 | 0.001 | 0.011 | 0.003 | — | 0.032 | 0.015 | 560 | 830 | 0.12 |
| B | 0.09 | 9.53 | 1.69 | 0.325 | 0.0023 | 0.001 | 0.01 | 0.003 | — | 0.031 | 0.015 | 550 | 845 | 0.10 |
| C | 0.15 | 7.72 | 0.94 | 0.218 | 0.0027 | 0.002 | 0.012 | 0.003 | 0.02 | — | 0.018 | 560 | 820 | 0.30 |

The tested compositions are gathered in the following table wherein the element contents are expressed in weight percent.

Ac1 and Ac3 temperatures of the cold-rolled sheet have been determined through dilatometry tests and metallography analysis.

TABLE 2

Process parameters of the hot rolled and heat-treated steel sheets

| | | Hot rolling | Coiling | Hot band annealing (HBA) | |
|---|---|---|---|---|---|
| Trials | Steel | FRT (° C.) | CT (° C.) | $T_{HBA}$(° C.) | $t_{HBA}$(h) |
| 1 | A | 900 | 450 | 640 | 10 |
| 2 | A | 900 | 450 | 640 | 10 |
| 3 | A | 900 | 450 | 640 | 10 |
| 4 | A | 900 | 450 | 640 | 10 |
| 5 | A | 900 | 450 | 640 | 10 |
| 6 | B | 900 | 450 | 640 | 10 |
| 7 | B | 900 | 450 | 640 | 10 |
| 8 | B | 900 | 450 | 640 | 10 |
| 9 | B | 900 | 450 | 640 | 10 |
| 10 | C | 850 | 450 | 640 | 10 |
| 11 | C | 850 | 450 | 640 | 10 |
| 12 | C | 850 | 450 | 640 | 10 |
| 13 | C | 850 | 450 | 640 | 10 |
| 14 | C | 850 | 450 | 640 | 10 |
| 15 | C | 850 | 450 | 640 | 10 |
| 16 | C | 850 | 450 | 640 | 10 |
| 17 | C | 850 | 450 | 640 | 10 |
| 18 | C | 850 | 450 | 640 | 10 |
| 19 | C | 850 | 450 | 640 | 10 |
| 20 | C | 850 | 450 | 640 | 10 |
| 21 | C | 850 | 450 | 640 | 10 |
| 22 | C | 850 | 450 | 640 | 10 |
| 23 | C | 850 | 450 | 640 | 10 |
| 24 | C | 850 | 450 | 640 | 10 |
| 25 | C | 850 | 450 | 640 | 10 |
| 26 | C | 850 | 450 | 640 | 10 |
| 27 | C | 850 | 450 | 640 | 10 |
| 28 | C | 850 | 450 | 640 | 10 |

Underlined values: parameters which do not allow to obtain the targeted properties Steel semi-products, as cast, were reheated at 1200° C., hot rolled and then coiled. The hot rolled and coiled steel sheets are then heat treated at a temperature $T_{HBA}$ and maintained at said temperature for a holding time $t_{HBA}$. The following specific conditions to obtain the hot rolled and heat-treated steel sheets were applied:

TABLE 3

Process parameters of the cold rolled, double annealed steel sheets

| | | First annealing | | Second annealing | |
|---|---|---|---|---|---|
| Trials | Cold rolling (%) | $T_1$(° C.) | $t_1$ (s) | $T_2$ (° C.) | $t_2$ (h) |
| 1 | 50 | 780 | 120 | <u>520</u> | 10 |
| 2 | 50 | 780 | 120 | <u>540</u> | 8 |
| 3 | 50 | 780 | 120 | <u>560</u> | 8 |
| 4 | 50 | 780 | 120 | <u>580</u> | 8 |
| 5 | 50 | 780 | 120 | 600 | 8 |
| 6 | 50 | 750 | 250 | 420 | 10 |
| 7 | 50 | 750 | 250 | 520 | 10 |
| <u>8</u> | 50 | 880 | 120 | <u>530</u> | 10 |
| <u>9</u> | 50 | 880 | 120 | <u>630</u> | 10 |
| <u>10</u> | 50 | 780 | 120 | <u>650</u> | 10 |
| <u>11</u> | 50 | 780 | 120 | <u>638</u> | 10 |
| <u>12</u> | 50 | 780 | 120 | <u>626</u> | 10 |
| 13 | 50 | 780 | 120 | 615 | 10 |
| 14 | 50 | 780 | 120 | 604 | 10 |
| 15 | 50 | 780 | 120 | 594 | 10 |
| 16 | 50 | 780 | 120 | 584 | 10 |
| 17 | 50 | 780 | 120 | 573 | 10 |
| 18 | 50 | 780 | 120 | 564 | 10 |
| <u>19</u> | 50 | 780 | 120 | <u>556</u> | 10 |
| <u>20</u> | 50 | 850 | 120 | <u>650</u> | 10 |
| <u>21</u> | 50 | 850 | 120 | <u>638</u> | 10 |
| 22 | 50 | 850 | 120 | 615 | 10 |
| 23 | 50 | 850 | 120 | 604 | 10 |
| 24 | 50 | 850 | 120 | 594 | 10 |

TABLE 3-continued

Process parameters of the cold rolled, double annealed steel sheets

| Trials | Cold rolling (%) | First annealing | | Second annealing | |
|---|---|---|---|---|---|
| | | $T_1$ (° C.) | $t_1$ (s) | $T_2$ (° C.) | $t_2$ (h) |
| 25 | 50 | 850 | 120 | 584 | 10 |
| 26 | 50 | 850 | 120 | 573 | 10 |
| 27 | 50 | 850 | 120 | 564 | 10 |
| 28 | 50 | 850 | 120 | 556 | 10 |

Underlined values: parameters which do not allow to obtain the targeted properties The hot rolled and heat-treated steel sheet obtained are then cold rolled. The cold rolled steel sheet are then first annealed at a temperature $T_1$ and maintained at said temperature for a holding time $t_1$, before being cooled down at a cooling speed of 2° C/s. The steel sheet is then heated a second time at a temperature $T_2$ and maintained at said temperature for a holding time $t_2$, before being cooled to room temperature. The following specific conditions to obtain the cold rolled and annealed steel sheets were applied:

The cold rolled, and annealed sheets were then analyzed, and the corresponding microstructure elements, mechanical properties and weldability properties were respectively gathered in Tables 4, 5 and 6.

The phase percentages of the microstructures of the obtained cold rolled and double annealed steel sheet were determined.

$[C]_A$ and $[Mn]_A$ corresponds to the amount of carbon and manganese in austenite, in weight percent. They are measured with X-rays diffraction for carbon C % and with an electron probe micro-analyzer, with a Field Emission Gun for manganese Mn %.

The surface fractions of phases in the microstructure are determined through the following method: a specimen is cut from the cold rolled and double annealed steel sheet, polished and etched with a reagent known per se, to reveal the microstructure. The section is afterwards examined through scanning electron microscope, for example with a Scanning Electron Microscope with a Field Emission Gun ("FEG-SEM") at a magnification greater than 5000x, in secondary electron mode.

Annealed martensite can be distinguished from fresh martensite through their morphology: annealed martensite has a smooth surface with sometimes carbides inside, as compared with fresh martensite which has a surface roughness and has no carbides.

The determination of the surface fraction of ferrite is performed thanks to SEM observations after Nital or Picral/Nital reagent etching.

The determination of the volume fraction of retained austenite is performed thanks to X-ray diffraction.

The density of precipitated carbides is determined thanks to a section of sheet examined through Scanning Electron Microscope with a Field Emission Gun ("FEG-SEM") and image analysis at a magnification greater than 15000x.

TABLE 4

Microstructure of the cold rolled and double annealed steel sheet

| Trials | Ferrite (%) | Annealed martensite (%) | Residual austenite (%) | $[C]_A$ (% wt) | $[Mn]_A$ (% wt) | $[C]_A^2 \times [Mn]_A$ (C $\%^2$ × Mn %) | Fresh martensite (%) | Carbides density (<4 × 10$^6$/mm$^2$) |
|---|---|---|---|---|---|---|---|---|
| 1 | 15 | 67 | 18 | 0.21 | 11 | 12.5 | 0 | Yes |
| 2 | 15 | 65 | 20 | 0.23 | 10.7 | 14.6 | 0 | Yes |
| 3 | 15 | 62 | 23 | 0.22 | 10.5 | 13.1 | 0 | Yes |
| 4 | 15 | 58 | 27 | 0.20 | 10.5 | 10.8 | 0 | Yes |
| 5 | 15 | 48 | 37 | 0.15 | 10.6 | 6.1 | 0 | Yes |
| 6 | 40 | 37 | 23 | 0.24 | 11.8 | 8.8 | 0 | Yes |
| 7 | 40 | 26 | 34 | 0.21 | 11.5 | 6.6 | 0 | Yes |
| 8 | 0 | 76 | 24 | 0.28 | 12.5 | 12.7 | 0 | Yes |
| 9 | 0 | 60 | 40 | 0.20 | 10.8 | 5.6 | 0 | Yes |
| 10 | 10 | 27 | 48 | 0.23 | 9.1 | 2.8 | 15 | Yes |
| 11 | 10 | 32 | 49 | 0.25 | 9.2 | 3.3 | 9 | Yes |
| 12 | 10 | 37 | 50 | 0.29 | 9.3 | 4.5 | 3 | Yes |
| 13 | 10 | 43 | 47 | 0.30 | 9.4 | 4.9 | 0 | Yes |
| 14 | 10 | 46 | 44 | 0.32 | 9.5 | 5.6 | 0 | Yes |
| 15 | 10 | 50 | 40 | 0.35 | 9.6 | 6.8 | 0 | Yes |
| 16 | 10 | 54 | 36 | 0.36 | 9.8 | 7.3 | 0 | Yes |
| 17 | 10 | 58 | 32 | 0.39 | 10 | 8.8 | 0 | Yes |
| 18 | 10 | 62 | 28 | 0.43 | 10.2 | 10.9 | 0 | Yes |
| 19 | 10 | 67 | 23 | 0.49 | 10.4 | 14.4 | 0 | No |
| 20 | 0 | 42 | 50 | 0.25 | 9.0 | 3.2 | 8 | Yes |
| 21 | 0 | 47 | 50 | 0.26 | 9.1 | 3.5 | 3 | Yes |
| 22 | 0 | 58 | 42 | 0.33 | 9.4 | 5.9 | 0 | Yes |
| 23 | 0 | 62 | 38 | 0.37 | 9.5 | 7.5 | 0 | Yes |
| 24 | 0 | 65 | 35 | 0.38 | 9.7 | 8.1 | 0 | Yes |
| 25 | 0 | 68 | 32 | 0.40 | 9.9 | 9.1 | 0 | No |
| 26 | 0 | 72 | 28 | 0.46 | 10.2 | 12.4 | 0 | No |
| 27 | 0 | 76 | 24 | 0.49 | 10.4 | 14.4 | 0 | no |
| 28 | 0 | 80 | 20 | 0.56 | 10.5 | 19.0 | 0 | No |

Underlined values: not corresponding to the invention

TABLE 5

Mechanical properties of the cold rolled, double annealed steel sheet

| Trials | TS (MPa) | UE (%) | YS (MPa) | [(YS − 200) × UE + (TS − 300) × TE]/ (C % * Mn %) | TE (%) |
|---|---|---|---|---|---|
| 1 | 1057 | 5.7 | 1057 | 16594 | 5.7 |
| 2 | 1041 | 7.7 | 1041 | 21972 | 7.7 |
| 3 | 1003 | 6.5 | 994 | 28710 | 15.3 |
| 4 | 994 | 6.6 | 953 | 29869 | 16.7 |
| 5 | 983 | 23.1 | 931 | 65939 | 28.8 |
| 6 | 1272 | 11.7 | 1203 | 31588 | 15.8 |
| 7 | 1135 | 13.7 | 1014 | 30039 | 17.5 |
| 8 | 1032 | 10.5 | 985 | 24119 | 17.0 |
| 9 | 916 | 17.9 | 823 | 30095 | 23.8 |
| 10 | 1372 | 15.3 | 413 | 20311 | 18.9 |
| 11 | 1281 | 23.5 | 616 | 29790 | 25.2 |
| 12 | 1159 | 24.1 | 667 | 30415 | 27.9 |
| 13 | 1073 | 26.8 | 738 | 33278 | 31.2 |
| 14 | 1020 | 26.7 | 762 | 33165 | 32.5 |
| 15 | 972 | 31.2 | 784 | 34943 | 33.1 |
| 16 | 964 | 30.7 | 803 | 34737 | 32.7 |
| 17 | 923 | 27.3 | 808 | 30796 | 30.6 |
| 18 | 923 | 26.8 | 819 | 30358 | 29.8 |
| 19 | 923 | 24.8 | 835 | 29255 | 29.1 |
| 20 | 1380 | 15.0 | 338 | 19041 | 18.5 |
| 21 | 1254 | 25.4 | 571 | 29887 | 26.4 |
| 22 | 1032 | 27.5 | 724 | 33810 | 33.8 |
| 23 | 958 | 25.4 | 736 | 29997 | 32.1 |
| 24 | 915 | 27.2 | 755 | 29712 | 31.4 |
| 25 | 895 | 24.2 | 758 | 26305 | 28.5 |
| 26 | 898 | 22.7 | 778 | 25738 | 27.9 |
| 27 | 899 | 19.7 | 793 | 23330 | 25.6 |
| 28 | 907 | 16.6 | 810 | 20381 | 22.2 |

Underlined values: do not match the targeted values

Mechanical properties of the obtained cold rolled, double annealed steel sheets were determined and gathered in the following table.

The yield strength YS, the tensile strength TS and the uniform and total elongation UE, TE are measured according to ISO standard ISO 6892-1, published in October 2009.

Trials 1, 2, 3, 4, 8, 19, 26, 27 and 28 were submitted to temperatures $T_2$ that were too low. The austenite formed is too stable as shown by the value of $([C]_A^2 \times [Mn]_A)/(\% C^2 \times \% Mn)$ that is too high, leading to a decrease in uniform elongation.

Trials 5, 9, 18, 24 on the contrary, were submitted to a T2 temperature that was high enough to ensure that the stability of austenite was according to target resulting in very good uniform and total elongations.

Moreover, trials 19, 25, 26, 27 and 28, were submitted to temperatures $T_2$ that was below Tc and included a too high amount of carbides, going beyond the maximum acceptable value of $4 \times 10^6/mm^2$.

Trials 10, 11, 12, 20 and 21 were submitted to temperatures $T_2$ that were too high. The austenite formed is too unstable as shown by the value of $([C]_A^2 \times [Mn]_A)/(\% C^2 \times \% Mn)$ that is too low, leading to a decrease in yield strength. Moreover, all these trials showed some fresh martensite formation, trials 10, 11 and 20 going above the maximum acceptable value of 5%. Trials 13 and 22, on the contrary, were submitted to a $T_2$ temperature that was low enough to ensure that the stability of austenite was according to target, without fresh martensite formation, resulting in very good properties.

TABLE 6

Weldability properties of the cold rolled, double annealed steel sheet

| Trials | α (daN/mm²) | LME index |
|---|---|---|
| 1 | 60 | 0.07 |
| 2 | 60 | 0.07 |
| 3 | 60 | 0.07 |
| 4 | 60 | 0.07 |
| 5 | 60 | 0.07 |
| 6 | 63 | 0.090 |
| 7 | 63 | 0.090 |
| 8 | 63 | 0.090 |
| 9 | 63 | 0.090 |
| 10 | 40 | 0.115 |
| 11 | 40 | 0.115 |
| 12 | 40 | 0.115 |
| 13 | 40 | 0.115 |
| 14 | 40 | 0.115 |
| 15 | 40 | 0.115 |
| 16 | 40 | 0.115 |
| 17 | 40 | 0.115 |
| 18 | 40 | 0.115 |
| 19 | 40 | 0.115 |
| 20 | 40 | 0.115 |
| 21 | 40 | 0.115 |
| 22 | 40 | 0.115 |
| 23 | 40 | 0.115 |
| 24 | 40 | 0.115 |
| 25 | 40 | 0.115 |
| 26 | 40 | 0.115 |
| 27 | 40 | 0.115 |
| 28 | 40 | 0.115 |

LME index = C % + Si %/4 in wt %.

Spot welding in standard ISO 18278-2 condition was done on the cold rolled, double annealed steel sheets.

In the test used, the samples are composed of two sheets of steel in the form of cross welded equivalent. A force is applied so as to break the weld point. This force, known as cross tensile Strength (CTS), is expressed in daN. It depends on the diameter of the weld point and the thickness of the metal. that is to say the thickness of the steel and the metallic coating. It makes it possible to calculate the coefficient α which is the ratio of the value of CTS on the product of the diameter of the welded point multiplied by the thickness of the substrate. This coefficient is expressed in daN/mm².

Weldability properties of the cold rolled and double annealed steel sheets were determined and gathered in the following table:

What is claimed is:

1. A cold rolled and double annealed steel sheet, made of a steel having a composition comprising, by weight percent:

C: 0.03-0.18%

Mn: 6.0-11.0%

0.2≤Al<3%

Mo: 0.05 -0.5%

B: 0.0005-0.005%

S≤0.010%

P≤0.020%

N≤0.008% and optionally one or more of the following elements:

$Si \leq 1.20\%$ $Nb \leq 0.050\%$ $Ti \leq 0.050\%$ $Cr \leq 0.5\%$ $V \leq 0.2\%$ a remainder of the composition being iron and unavoidable impurities resulting from processing;

the steel sheet having a microstructure comprising in surface fraction from 0% to 45% of ferrite, from 20% to 50% of retained austenite, from 5 to 80% of annealed martensite, less than 5% of fresh martensite, a carbon $[C]_A$ and manganese $[Mn]_A$ content in austenite, expressed in wt %, such that the ratio $([C]_A^2 \times [Mn]_A)/(C\%^2 \times Mn\%)$ is from 4.5 to 11.0, C % and Mn % being the nominal C and Mn weight percent in the steel, and a carbides density below $4 \times 10^6/mm^2$.

2. The steel sheet as recited in claim 1 wherein the carbon content is from 0.05% to 0.15%.

3. The steel sheet as recited in claim 1 wherein the manganese content is from 6.0% to 9%.

4. The steel sheet as recited in claim 1 wherein the aluminium content is from 0.2% to 2.2%.

5. The steel sheet as recited in claim 1 wherein the microstructure comprises from 5% to 25% of ferrite, from 25% to 50% of retained austenite and from 25% to 70% of annealed martensite.

6. The steel sheet as recited in claim 1 wherein the ferrite is present and is equiaxed.

7. The steel sheet as recited in claim 1 wherein the microstructure comprises no ferrite, from 25% to 45% of retained austenite and from 55% to 75% of annealed martensite.

8. The steel sheet as recited in claim 1 wherein the tensile strength is above or equal to 900 MPa, the uniform elongation UE is above or equal to 11.0%, the yield strength YS is above or equal to 700 MPa and the total elongation TE, are such that $[(YS-200) \times UE + (TS-300) \times TE]/(C\% \times Mn\%)$ is above 29,000.

9. The steel sheet as recited in claim 1 wherein the LME index is below 36.

10. The steel sheet as recited in claim 1 wherein the steel has a carbon equivalent Ceq lower than 0.4%. the carbon equivalent being defined as $Ceq = C\% + Si\%/55 + Cr\%/20 + Mn\%/19 - Al\%/18 + 2.2P\% - 3.24B\% - 0.133 \times Mn\% \times Mo\%$ with elements being expressed by weight percent.

11. A resistance spot weld of two steel parts made of the cold rolled and double annealed steel sheet as recited in claim 1, the resistance spot weld having an α value of at least 30 daN/mm².

* * * * *